United States Patent [19]

Trew

[11] Patent Number: 5,166,790
[45] Date of Patent: Nov. 24, 1992

[54] METHOD AND APPARATUS FOR MAINTAINING THE MEAN VALVES OF VIDEO SIGNALS

[75] Inventor: Timothy I. P. Trew, Horley, England

[73] Assignee: U.S. Philips Corporation, New York, N.Y.

[21] Appl. No.: 563,476

[22] Filed: Aug. 6, 1990

[30] Foreign Application Priority Data

Aug. 25, 1989 [GB] United Kingdom ............... 8919340
Mar. 21, 1990 [GB] United Kingdom ............... 9006325

[51] Int. Cl.⁵ .............................................. H04N 7/12
[52] U.S. Cl. .................................. 358/138; 358/164
[58] Field of Search ............................... 358/138, 164

[56] References Cited

U.S. PATENT DOCUMENTS

| | | | |
|---|---|---|---|
| 4,774,562 | 9/1988 | Chen et al. ........................ | 358/138 |
| 4,922,342 | 5/1990 | Fonsalas ........................... | 358/138 |
| 4,935,813 | 6/1990 | Fonsalas ........................... | 358/138 |
| 4,942,466 | 7/1990 | Sandbank et al. ................ | 358/138 |
| 4,965,667 | 10/1990 | Trew et al. ....................... | 358/138 |

Primary Examiner—Howard W. Britton
Assistant Examiner—Minsun Oh
Attorney, Agent, or Firm—Michael E. Marion

[57] ABSTRACT

A video signal with pre-emphasis is applied via an input to an HD-MAC encoder, the encoded output being applied over a first path to an input of an adder. The encoded signal is also applied via a decoder and a further path comprising a de-emphasis circuit, a mean value estimator circuit and a pre-emphasis circuit, to an input of a difference circuit. The video signal from the encoder input is also applied to a second input to the difference circuit, via a reference path comprising components which correspond to the de-emphasis circuit, mean value estimator, and pre-emphasis circuit in the further path. The difference in the pre-emphasized mean values obtained from the difference circuit is applied via a shuffler and added to the video signal in the first path.

22 Claims, 8 Drawing Sheets

METHOD AND APPARATUS FOR MAINTAINING THE MEAN VALVES OF VIDEO SIGNALS

BACKGROUND OF THE INVENTION

The present invention relates to apparatus for maintaining the mean values of the luminance and/or saturation of a video signal comprising a first path conveying a video signal with pre-emphasis having a pictorial content. The invention also relates to a method for maintaining such mean values.

In the HD-MAC television system currently being established in the EUREKA EU 95 high definition television project a problem has been found in the way in which gamma-corrected television signals are processed within an HD-MAC encoder which emphasises the boundaries between blocks which have been filtered with different characteristics. This problem has been reported in the paper "Colorimetry and constant luminance coding in a compatible HDMAC system" by S. C. Chen, F. Le Goff, R. Melwig and R. Schafer, IBC 88, Brighton, Sept. 24-27, 1988. When this effect is visible it overrides all other artifacts and can be particularly obtrusive since it occurs over a large area and can still be observed at viewing distances so great that the detail in the picture can no longer be resolved. The above paper proposes to use a true constant luminance system which would overcome these problems but, since a linear luminance signal must be digitized with at least 11 bits to avoid excessive noise near black, this would substantially increase the size and cost of the encoder and more significantly the decoder. An alternative unfiltered gamma-corrected representation may be digitized with 8 bits but this requires a higher sampling frequency. It seems unlikely that video tape recorders capable of storing this extra data will become economically available for some time.

It is an object of the invention to provide apparatus and a method that can be used to overcome the above problem and which can also be used in other circumstances.

SUMMARY OF THE INVENTION

The invention provides apparatus for maintaining the mean values of the luminance and/or saturation of a video signal comprising a first path conveying a video signal with pre-emphasis having a pictorial content, characterized in that said apparatus further comprises a reference path having
- first de-emphasis means for removing the pre-emphasis present in a video signal in that path with a given pre-emphasis characteristic and the said pictorial content,
- first estimating means for estimating the mean values of the linearized signal from said first de-emphasis means, and
- first pre-emphasis means for applying pre-emphasis to the mean values obtained from said first estimating means and whose characteristic is substantially the inverse of that of said first de-emphasis means, a further path having
- second de-emphasis means for at least partially removing or modifying the pre-emphasis in a video signal in that path having the said pictorial content,
- second estimating means for estimating the mean values of the at least partially linearized or modified signal from said second de-emphasis means, and
- second pre-emphasis means for applying pre-emphasis to the mean values obtained from said second estimating means and whose characteristic is substantially the inverse of that of the second linearizing means, first summing means for producing the difference between the outputs of said first and second pre-emphasis means, and second summing means for adding this said difference to the video signal in said first path, the output of the second summing means forming the video signal with the required maintained mean values.

The invention has the advantage that when a video signal is subjected to a given pre-emphasis characteristic the mean values of the luminance and/or saturation of the signal may be restored or may be changed if the video signal is to be displayed on a display of a type different to that for which the pre-emphasis was originally intended.

Such apparatus may additionally comprise means for motion compensated averaging the difference produced by said first summing means and for applying the averaged difference to said second summing means.

If the video signal in said first path is encoded according to a given standard in an encoder the video signal for said first path may be derived from the output of said encoder while the video signal for said further path may be the decoded output of said encoder, the video signal for said reference path being the video signal prior to encoding.

Where the encoder changes the format of said video signal, re-formatting means may be provided between said first summing means or said motion compensated averaging means and said second summing means to provide conformity between the formats of the video signal at the output of the second summing means and that in said first path.

If the video signal from said second summing means is for application to a display device of a type different to that intended by the video signal applied to said reference path, the characteristics of said second de-emphasis means and said second pre-emphasis means may be matched to said different display device.

Where the apparatus is for use in an arrangement which processes a video signal encoded to a given standard, the arrangement may comprise a decoder for decoding said encoded video signal, the output of the decoder providing the video signals for the first, the reference and the further paths. Should the display rate be different to that of the video signal applied to the decoder the output of said decoder may be applied to a standards converter whose output provides the video signal for the first and the further paths while a second standards converter, comparable to the first standards converter, may be provided between the output of the first estimating means and the input of the first pre-emphasis means in said reference path. Such a case may be where the rate of the original video signal is 50 Hz while the display tube is 100 Hz.

The output of said decoder may be applied to a first motion compensated temporal interpolator whose output is applied to said first and said further paths, a second motion compensated temporal interpolator being provided between the output of said first estimating means and the input of said first pre-emphasis means in the reference path. The decoder may be replaced by first and second decoders whose characteristics differ substantially from each other, the first decoder supplying signals to the first and further paths whilst the second decoder supplies signals to the reference path.

Instead of having two separate de-emphasis means, the first de-emphasis means in said reference path and the second de-emphasis means in said further path may be formed by a common de-emphasis means.

When the apparatus is used in texture mapped image synthesis the first path and the second path may each be duplicated, the first duplicated paths being connected to respective first and second inputs of a first changeover switch while the further duplicated paths are connected to respective first and second inputs of a second changeover switch, the output of the duplicated de-emphasis means each being additionally connected to respective first and second inputs of a third changeover switch whose output is connected to said second estimating means in the preference path, the output from the first changeover switch providing a first path input to said second switching means whilst the output from the second changeover switch provides the further path input to said first summing means. The first duplicated paths and the further duplicated paths may be fed from duplicate input terminals, each input terminal receiving a positionally different but adjacent texture map input signal whilst said first estimating means creates a reference across the transition between adjacently positioned signals.

The invention also provides a method for maintaining the mean values of the luminance and/or saturation of a video signal with pre-emphasis having a pictorial content, characterized by the steps of:

i) a first de-emphasis of a reference video signal with a given pre-emphasis characteristic and the said pictorial content to produce a first video signal without pre-emphasis, ii) estimating first mean values of said de-emphasized first video signal, iii) applying pre-emphasis to said first mean values, the characteristic of the pre-emphasis being substantially the inverse of the first de-emphasis, iv) a second de-emphasis of a pre-emphasized video signal having the said pictorial content to produce a substantially de-emphasized second video signal with at least reduced or modified pre-emphasis, v) estimating second mean values of said substantially de-emphasized second video signal, vi) applying pre-emphasis to said second mean values, the characteristic of the pre-emphasis being substantially the inverse of the second de-emphasis, vii) determining the difference between the pre-emphasized first and second mean values, and viii) adding the said difference to a pre-emphasized video signal having the said pictorial content to form the video signal with the required mean values.

From a further aspect the invention provides a method for maintaining the mean values of the luminance and/or saturation of a video signal with pre-emphasis having a pictorial content, characterized by the steps of:

i) applying de-emphasis to a reference video signal with a given pre-emphasis characteristic and the said pictorial content to produce a first video signal without pre-emphasis, ii) estimating first mean values of said de-emphasized video signal, iii) applying pre-emphasis to said first mean values, the characteristic of the pre-emphasis being substantially the inverse of the de-emphasis, iv) estimating second mean values of said de-emphasized video signal, v) applying pre-emphasis to said second mean values, the characteristic of the pre-emphasis being substantially the inverse of the second de-emphasis, vi) determining the difference between the pre-emphasized first and second mean values, and vii) adding the said difference to a pre-emphasized video signal having the said pictorial content to form the video signal with the required mean values.

The said difference may be subjected to motion compensating averaging prior to adding to said pre-emphasized video signal.

Where the pre-emphasized video signal is encoded according to a given standard said first de-emphasis may be of the pre-emphasized video signal prior to encoding whilst the second pre-emphasis may be of the encoded pre-emphasized television signal after it has been decoded, the said difference being added to the encoded pre-emphasized video signal. Where the encoding of said video signal changes its format, the said difference may be re-formatted prior to said addition to ensure conformity between the formats of the video signals prior to and following said addition.

If the pre-emphasized video signal to which said difference has been added is for application to a display device of a type different to that intended for the pre-emphasized video signal prior to de-emphasis, the characteristics of the second de-emphasis and the pre-emphasis applied to the second mean values may be matched to the different display device.

Where the method is used in an arrangement which processes a video signal encoded according to a given standard, said encoded video signal may be decoded prior to being subjected to first or second de-emphasis or added to the said difference. The decoded video signal may be subjected to standards conversion prior to second de-emphasis or addition to the said difference whilst the substantially de-emphasized video signal following first de-emphasis may be subjected to standards conversion prior to pre-emphasis of the first mean values. Alternatively motion compensated temporal interpolation may be applied to the decoded video signal and to said first mean values.

When the method is used for image synthesis the said video signal may comprise first and second components whose pictorial content differ from each other, the first and second components each being subjected to steps (iv) and (v) of the method of the further aspect while the said difference is between the pre-emphasized second mean values alternately derived from said first and second components and the pre-emphasized first mean values, the reference video signal being alternately derived from said first and second components while the said difference is alternately added to said first and second components.

BRIEF DESCRIPTION OF THE DRAWINGS

The above and other features of the invention will now be described, by way of example, with reference to the accompanying drawings in which.

DETAILED DESCRIPTION OF THE PREFERRED EMBODIMENTS OF THE INVENTION

Figure 1:
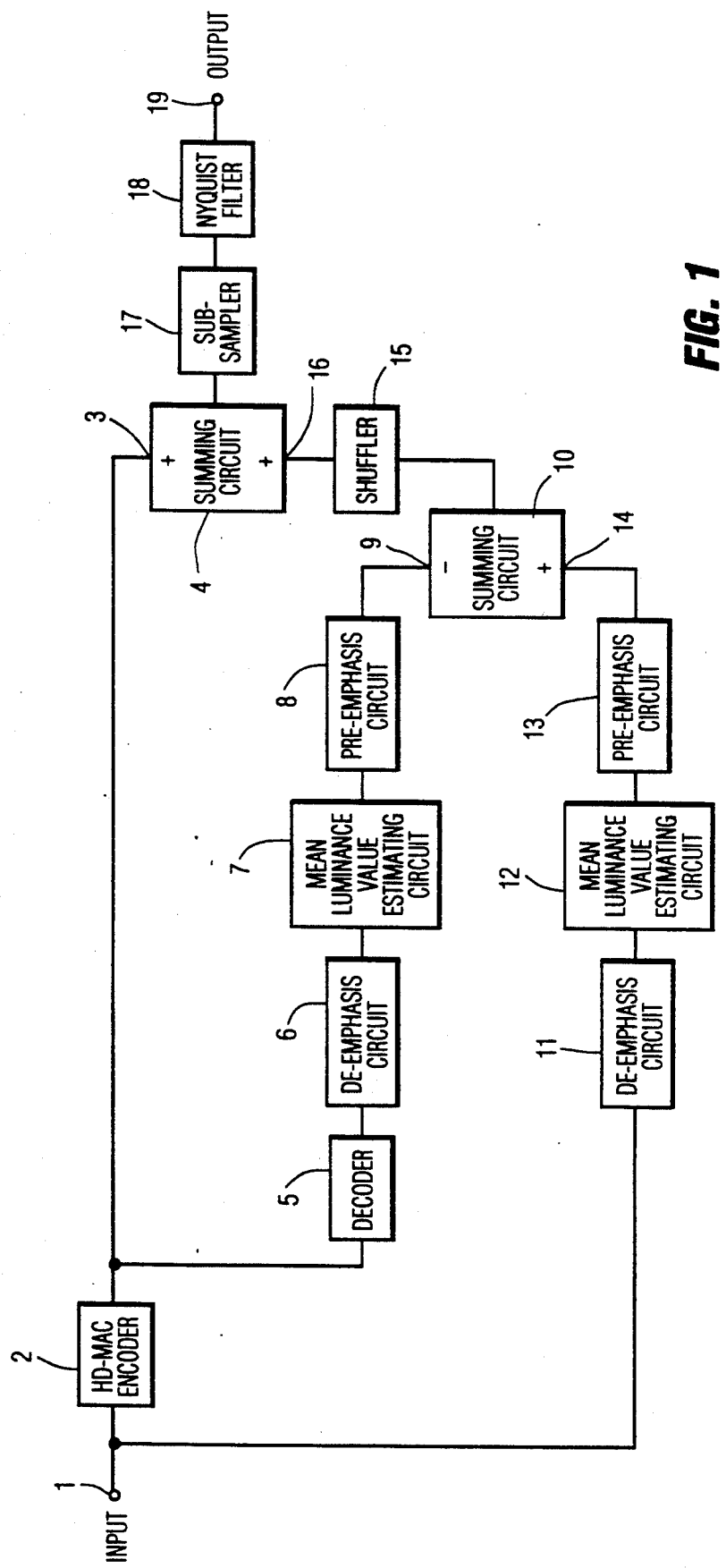
FIG. 1 is a block diagram of a first embodiment of apparatus according to the invention.

FIG. 1 shows a block diagram of a first embodiment of the invention which may be used at the transmission side of a television system. For the sake of simplicity only the processing of the luminance signal will be described though it will be appreciated that the colour components of a television signal may be processed in a similar manner. An input terminal 1 receives the luminance signal from a television signal produced by a television signal source (not shown) such as a high definition television camera. It is assumed that at the camera the luminance signal is subjected to a pre-emphasis (gamma correction) to match the brightness contrast on the screen of a display tube at a television receiver to that in a scene viewed by the television camera. Such gamma correction takes the form of a pre-emphasis applied to the signal and is dependent on the type of display expected at the receiver and in general is matched to a colour cathode ray tube whose phosphors have specified characteristics.

The luminance signal from input 1 is applied to an encoder 2. The encoder 2 encodes the luminance signal in accordance with the HD-MAC coding scheme which is currently the subject of the EUREKA EU 95 high definition television project. The proposed HD-MAC coding scheme and suitable encoding equipment have been described in publications elsewhere and it is not intended to go into detail on the coding schemes or coding equipment. Such publications include "HD-MAC Coding of High Definition Television" by F. W. P. Vreeswijk, F. Fonsalas, T. I. P. Trew, C. M. Carey-Smith and M.-R. Haghiri, IBC 88, Brighton, 24-27th Sep. 1988, "HD-MAC Coding for Broadcasting of High Definition Television Signals" by F. W. P. Vreeswijk, contribution to the Club de Rennes Young Researcher's Seminar, M.I.T. Cambridge, Mass., U.S.A., 9-13th Oct. 1988, and European Patent Application 0322955 A1 (U.S. Ser. No. 281,294 filed Dec. 7, 1988). HD-MAC is a block-orientated coding scheme where the luminance signal is filtered according to its motion. By filtering gamma-corrected signals which contain high frequencies a d.c. shift occurs which, unless corrected, makes the mean perceived luminance darker. If in such a block-orientated coding scheme some adjacent blocks have been filtered in different ways the block structure may become visible due to this d.c. shift. The further components shown in FIG. 1 can overcome or at least mitigate this problem.

The encoded output from encoder 2 is applied over a first path to a first (+) input 3 of a summing circuit 4. This output is also applied to a further path which comprises a decoder 5, a de-emphasis circuit 6, a circuit for estimating the mean luminance 7 and a pre-emphasis circuit 8, the output of the further path being applied to a first (−) input 9 of a further summing circuit 10. The decoder circuit 5 provides the complementary decoding operation to the coding operation performed by the encoder 2, the resulting decoded luminance signal having the gamma-correction pre-emphasis removed from it by the de-emphasis circuit 6 to produce a constant luminance signal. The mean values of this resulting luminance signal are then produced by the circuit 7, these mean values not being derived over a period that is sufficiently long that it would cause overshoot problems but can be worked out subjectively by watching, in a resulting display, for a reduction in aliasing until it is not observable. The resulting mean values are then gamma corrected in the pre-emphasis circuit 8 whose characteristic is substantially the complement of that of the de-emphasis circuit 6.

The luminance signal from the input 1 is additionally applied to a reference path which comprises a further de-emphasis circuit 11, a further circuit 12 for estimating the mean values of the luminance and a further pre-emphasis circuit 13, the output of the reference path being connected to a second (+) input 14 of the summing circuit 10. The components of the reference path perform the same functions as those in the further path, the processing being performed on the luminance signal prior to encoding.

The summing circuit 10 produces the difference between the gamma-corrected mean values of the luminance signals produced in the further and reference paths, and this low frequency difference is applied via a shuffler 15 which shuffles the pixels in the same manner as that in encoder 2 to a second (+) input 16 of the summing circuit 4 where the difference in the gamma corrected mean values is added to the encoded signal from the encoder 2 to produce an encoded luminance signal in which the mean values of the luminance have been re-established to prevent the disturbance mentioned above. This luminance signal is applied through a subsampler 17 and Nyquist filter 18 required in the processing of an HD-MAC signal to an output terminal 19 for transmission.

With the HD-MAC system digital assistance signals are also produced by the encoding process which will also be applied to the circuits 7 and 12 for estimating mean luminance values to control the area of the region in which the mean is calculated and also to the shuffler 15 to control the shuffling format.

The operation of de-emphasis circuits 6 and 11 have so far assumed to be the same as has the operation of the pre-emphasis circuits 8 and 13 as no change in the gamma correction characteristic has been contemplated. The invention however may be used to change the gamma correction in a television signal where the signal is to be displayed by a display having a different signal input to light output characteristic to that anticipated e.g. where it is anticipated at the transmitter that the display will be a cathode ray tube with specified phosphor characteristics but where the actual display is an L.C.D. or a laser display. An embodiment is shown in FIG. 2 which produces such a change in the gamma correction where components which correspond with those in FIG. 1 are given the same reference numbers.

Figure 2:
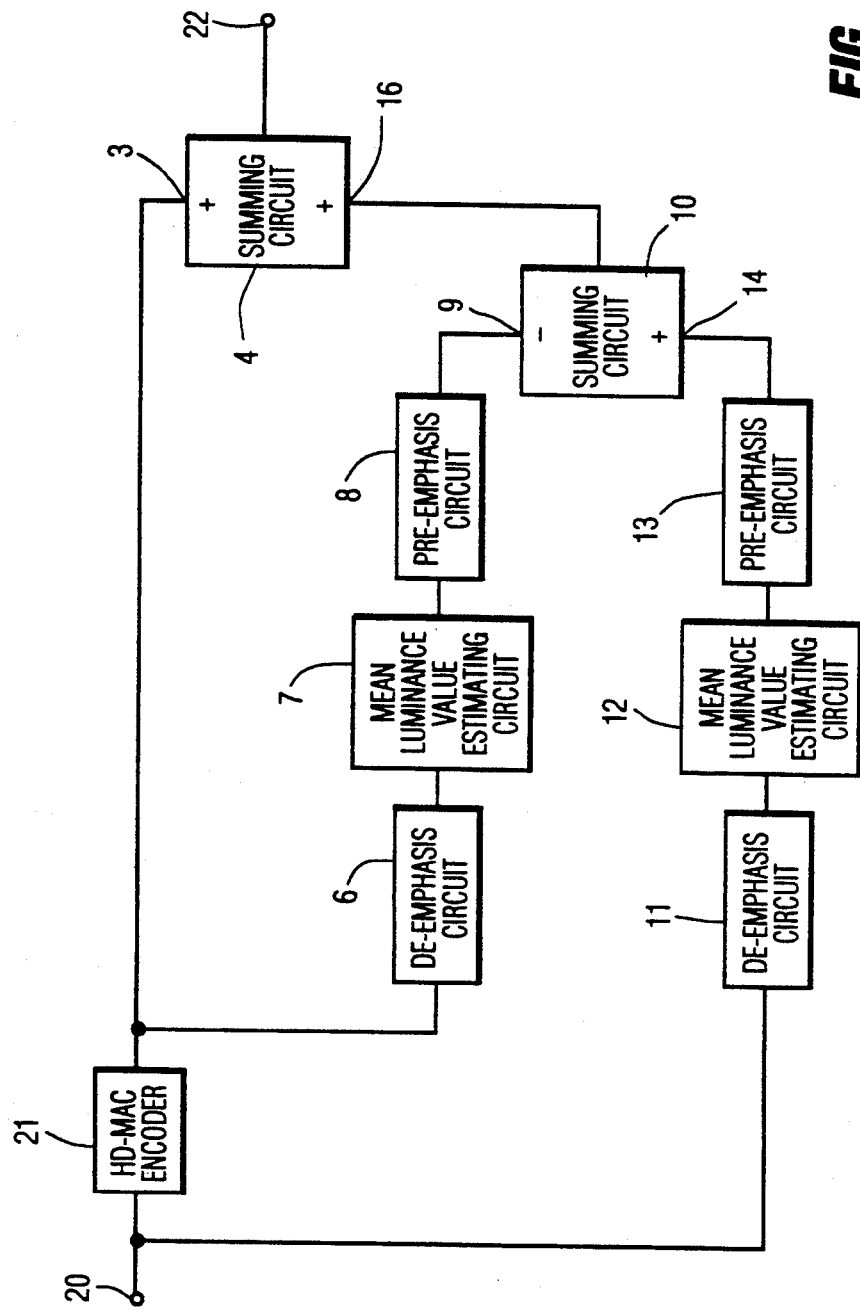
FIG. 2 is a block diagram of a second embodiment of apparatus according to the invention.

In FIG. 2 it is assumed that the components shown therein are located in a receiver and that a terminal 20 receives a television signal of HD-MAC form which is decoded by an HD-MAC decoder 21 as described in the publications referred to in relation to FIG. 1. Other forms of encoding are possible in which case decoder 21 would be appropriate to the chosen standard. The decoded signal is applied to input 3 of summing circuit 4 via the first path and is also applied through the further and reference paths to the respective inputs 9 and 14 of summing circuit 10. The further path does not require a decoder and the remaining components 6, 7 and 8, function in a similar manner as described in relation to FIG. 1. The reference path has the same components 11, 12 and 13 as those provided in the corresponding path in FIG. 1 with the de-emphasis circuit 11 having a characteristic complementary to that of the gamma corrector provided at the transmitter. In FIG. 2, the de-emphasis circuit 6 has a de-emphasis characteristic which corresponds to that of the display on which the television signal is to be displayed to produce a substantially constant luminance signal. Circuit 7 then produces the mean values of that signal whilst the pre-emphasis circuit 8 has a characteristic which is substantially the complement of the de-emphasis circuit 6. Summing circuit 10 again produces the differences between the mean signals provided by the first and second paths which is added to the luminance signal in the first path by summing circuit 4. Output terminal 22 then conveys the luminance signal with modified gamma correction for further processing prior to display.

Figure 3:
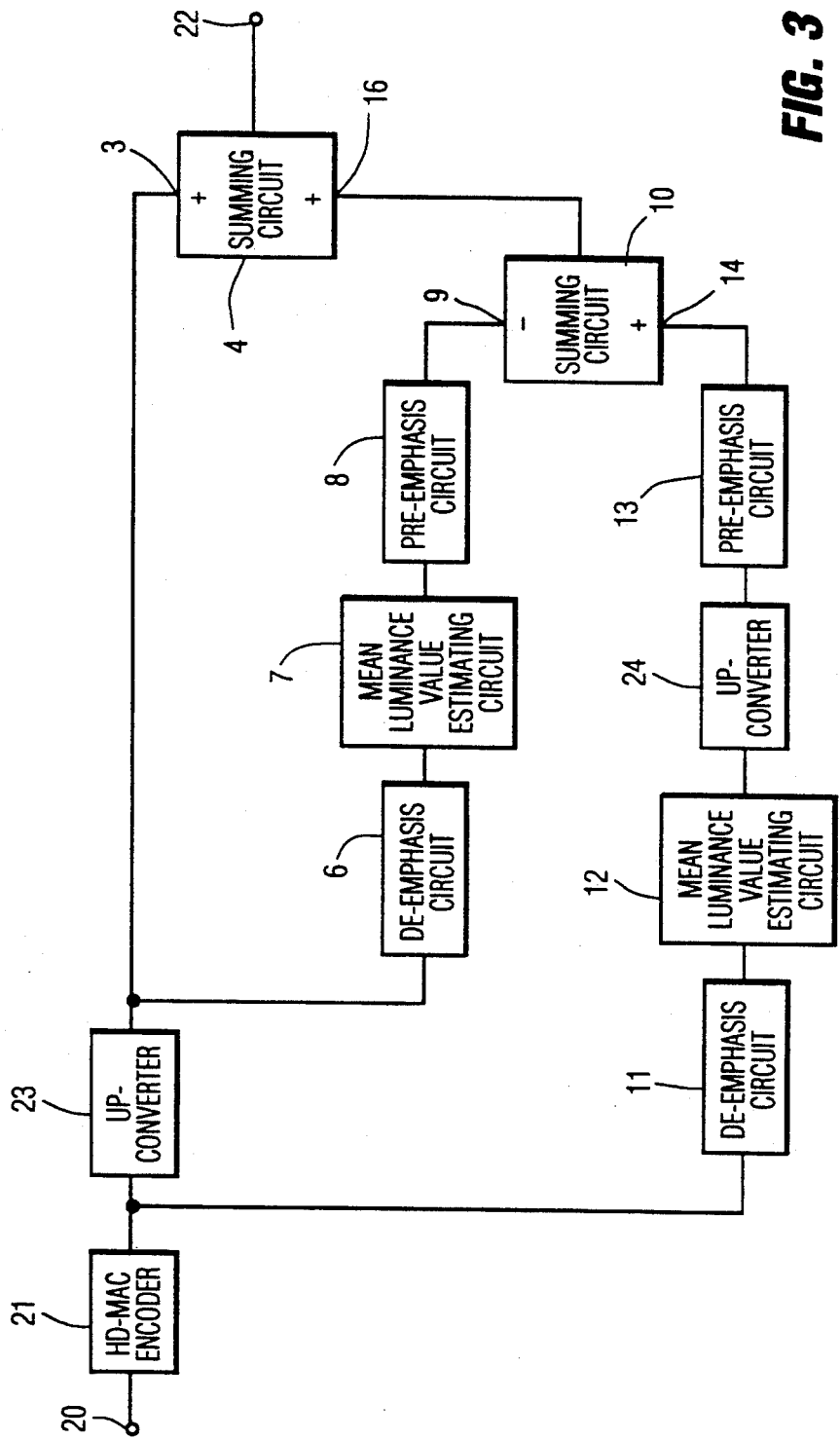
FIG. 3 is a modification of the diagram of FIG. 2.

FIG. 3 shows a modification of the embodiment shown in FIG. 2 but for where the incoming signal is to be up-converted. Components in FIG. 3 having the same reference numbers as those in FIG. 2 correspond and operate in the same manner as in the case for FIG. 2. In FIG. 3 it is assumed that the signal at input 20 has 625 lines with a field rate of 50 Hz and that it is required to upconvert this for a 100 Hz field rate display. An appropriate up-converter 23 is then included between the decoder 21 and the first and further paths while a similar converter 24, or at least a unit having the same filtering characteristics as those in up-converter 23, is included between the circuit for estimating mean luminance 12 and the pre-emphasis circuit 13. The operation of FIG. 3 is then substantially similar to that of FIG. 2 save for the up-conversion.

Although the invention is not limited thereto, the above embodiments are all described with reference to the HD-MAC bandwidth reduction system. This uses three processing branches with filters having different spatial frequency characteristics. The difference in the mean luminance between the branches emphasizes the boundaries between blocks which had been filtered with different characteristics. Although the described embodiments are capable of substantially reducing the differences in the mean luminance of signals encoded through different branches, it may not give completely satisfactory results in the 40 ms branch. This is because the even fields are discarded by the encoder and reconstructed at the decoder using motion-compensated temporal interpolation using motion vectors estimated at the encoder. If the motion vectors are not perfect, either because the motion in the scene is not strictly translational or because of the limited precision of the transmitted vectors, then the resolution and the brightness of the even fields will be lower than that of the odd fields. It is not possible to adjust the mean luminance of those parts of the even field which have been encoded through the 40 ms branch directly. A range of solutions are possible within the restrictions of the HD-MAC coding algorithm, which does not permit the use of a more precise motion description. The system implications of each of these solutions are described below and determine the solution to be used in any particular application.

Figure 4:
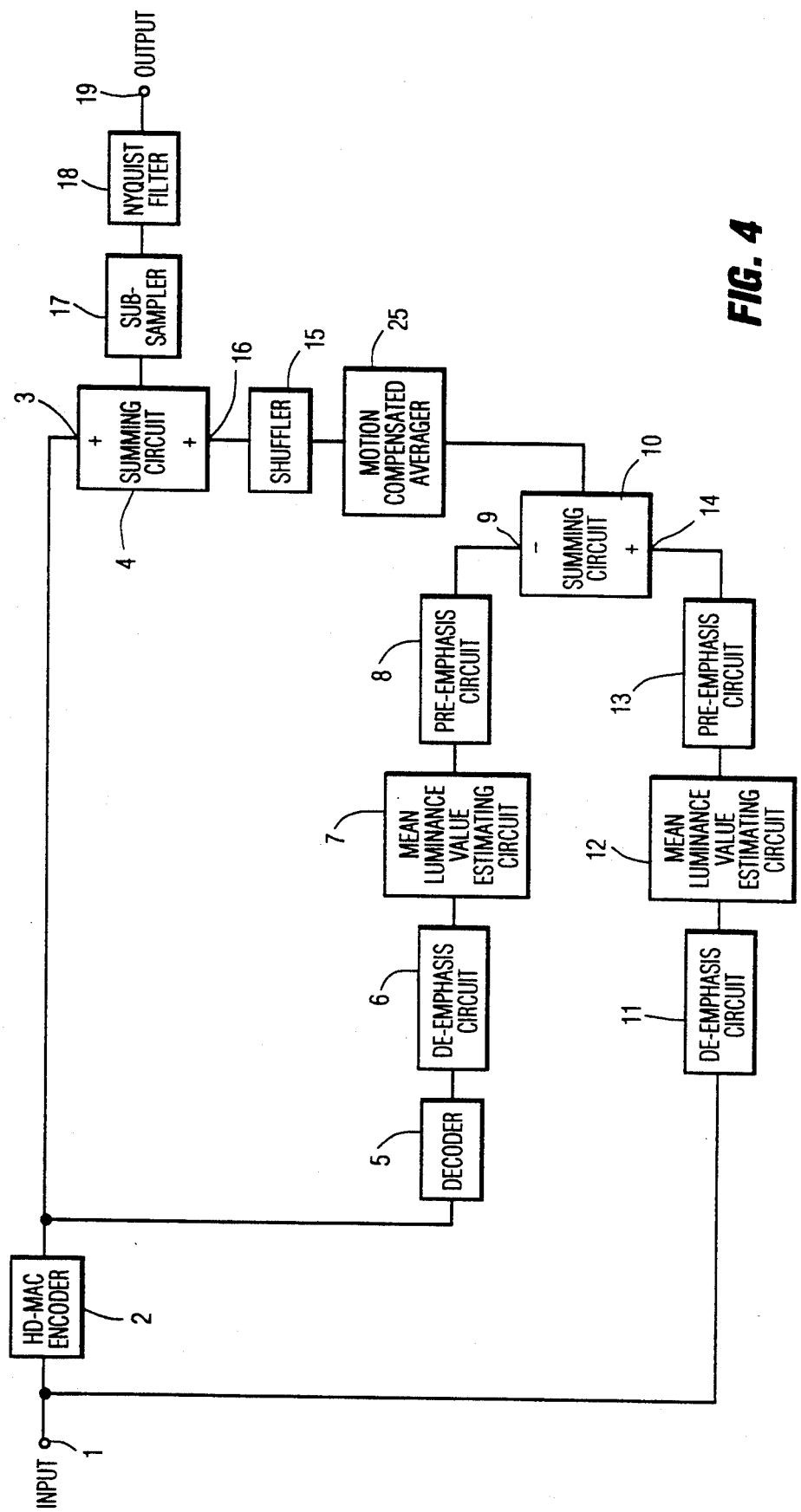
FIG. 4 is a modification of the diagram of FIG. 1.

A first such solution is shown in the embodiment in FIG. 4 which is a modification of the block diagram of FIG. 1 and where corresponding components between the two figures are indicated by like references. FIG. 4 differs from FIG. 1 in that a motion compensated averager 25 is provided between the output of summing circuit 10 and the input of shuffler 15. This averager takes a motion-compensated average of the even and odd field adjustments. The motion-compensated average takes the adjustment value for each pixel in the even field of 40 ms blocks and projects it backwards and forwards into the neighboring odd fields, not all of which will be 40 ms blocks. The projected adjustments are accumulated in the odd fields and a record is kept of the number of even field pixels which have been projected onto each odd field pixel. For motion vectors with an even vertical component, which do not map directly onto odd field pixels, the vertical neighbors are increased equally. The accumulated values are finally divided by the number of values in the accumulator, including the original odd field value, before being passed on to the shuffler 15 which again shuffles the pixels in the same manner as that in encoder 2.

The effect of the use of the motion compensated averager 25 is to overcompensate the odd fields and to increase the compensation of the even fields, without fully compensating them, in such a way that the sum of the luminance of the two fields will be correct. For low speeds the eye will integrate the luminance from the two fields so that the mean luminance will appear to be correct, while the difference in luminance between the two fields is not enough for the 25 Hz flicker to be annoying. Although the eye will not integrate the fields at higher speeds, the luminance differences are most visible at the boundary between 40 ms and 80 ms areas, where the speed is necessarily low. It would be possible to restrict the motion-compensated accumulation to vectors with a small magnitude, but, since the best-match criterion used in the HD-MAC motion estimator is not guaranteed to find true motion vectors, this has not been implemented.

This approach requires no modification to the decoder, but, since it incorporates a model of the decoder motion compensated temporal interpolation at the encoder, it restricts future decoder developments. It also degrades the compatible picture by overcompensating the luminance adjustment transmitted pixels in 40 ms blocks with no information from the dimmer even fields. The approach is most appropriate for applications, such as CD-I, in which the compatible picture is never viewed.

Figure 5:
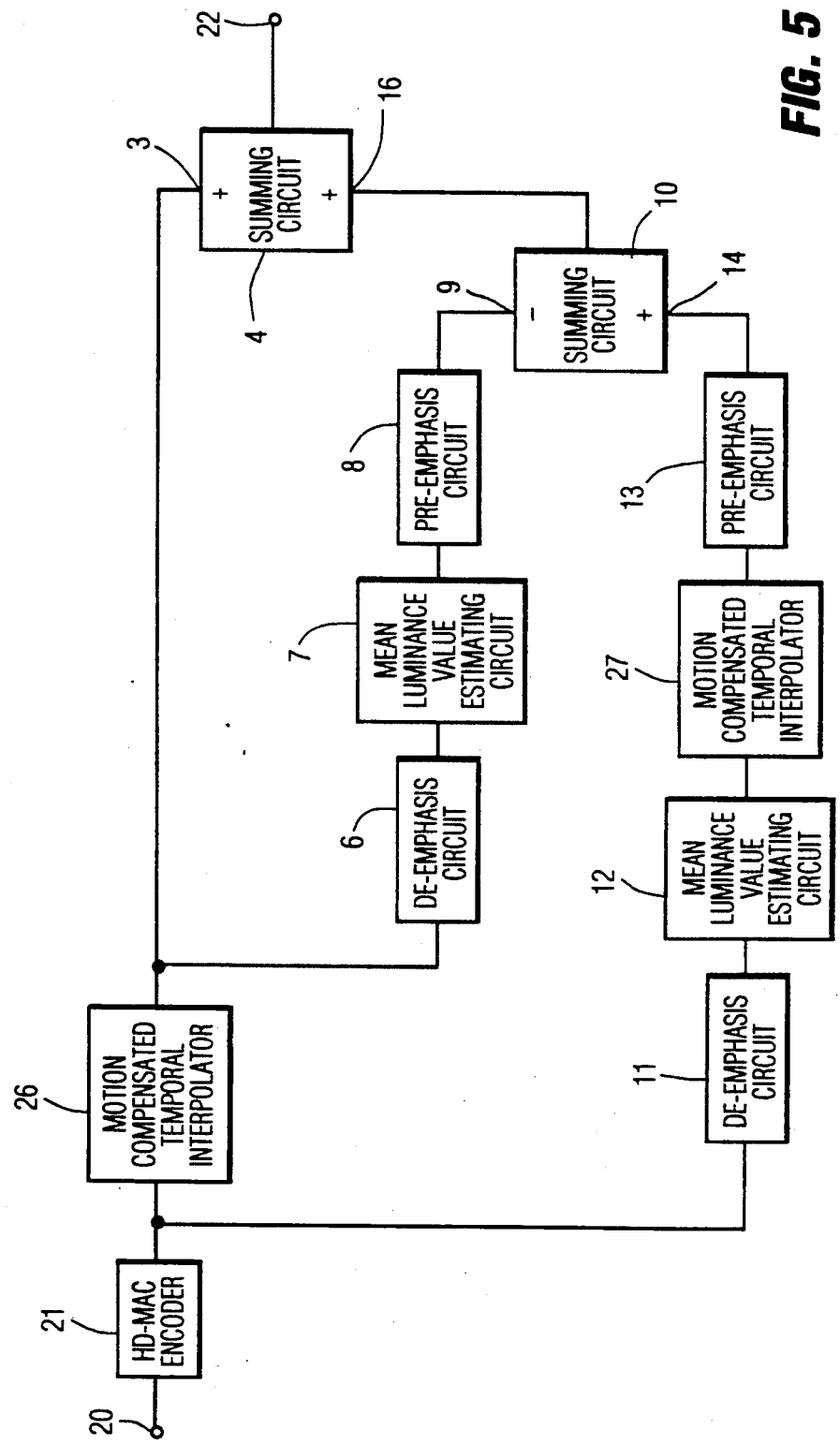
FIG. 5 is a modification of the diagram of FIG. 3.

A second solution is provided in FIG. 5 where it is assumed that the components shown therein are located in a receiver, this figure being similar to FIG. 3 and where like components between the two figures are indicated by like references. In FIG. 5 the spatially interpolated video signal from decoder 21 is applied to a first motion compensated temporal interpolator 26 whose output is applied to input 3 of summing circuit 4 via the first path and is also applied through the further path to input 9 of summing circuit 10, the further path being the same as that in FIG. 3. The reference path also has the same components 11, 12 and 13 but a second motion compensated temporal interpolator 27 is included between the mean values estimating circuit 12 and the further pre-emphasis circuit 13. By positioning interpolator 27 after estimating circuit 12 results in the motion compensated temporal interpolation being performed on the low-frequency luminance signal in the reference path so that the luminance losses in the motion compensated temporal interpolator, caused by insufficient precision in the motion vectors, will not occur in this path.

The embodiment of FIG. 5 places few constraints on future decoder designs since no assumptions are made about the details of the decoder motion compensated temporal interpolation at the encoder, but is does increase the decoder complexity. It does not degrade the compatible picture and can be introduced at any time in the future, although luminance adjustment must have been performed at the encoder to compensate for losses in the spatial filters for it to be worthwhile. In addition, it could be used for the same purpose as FIG. 3 with the first motion compensated temporal interpolator 26 being formed by an up-converter as may interpolator 27 whilst the de-emphasis (6) and pre-emphasis (8) circuits may be matched to the display.

A third solution uses hybrid motion-compensated luminance adjustment which introduces a simple correction to boost the luminance of the even fields in the decoder, and uses the same encoder adjustment as that described in relation to FIG. 4. If this technique is introduced into both the bandwidth reduction decoder and the model at the encoder then a high-quality adjustment can be made for the even field losses without degrading the compatible picture excessively or making the HD decoder unduly costly. It does, however, place tight constraints on future HD decoder design.

Figure 6:
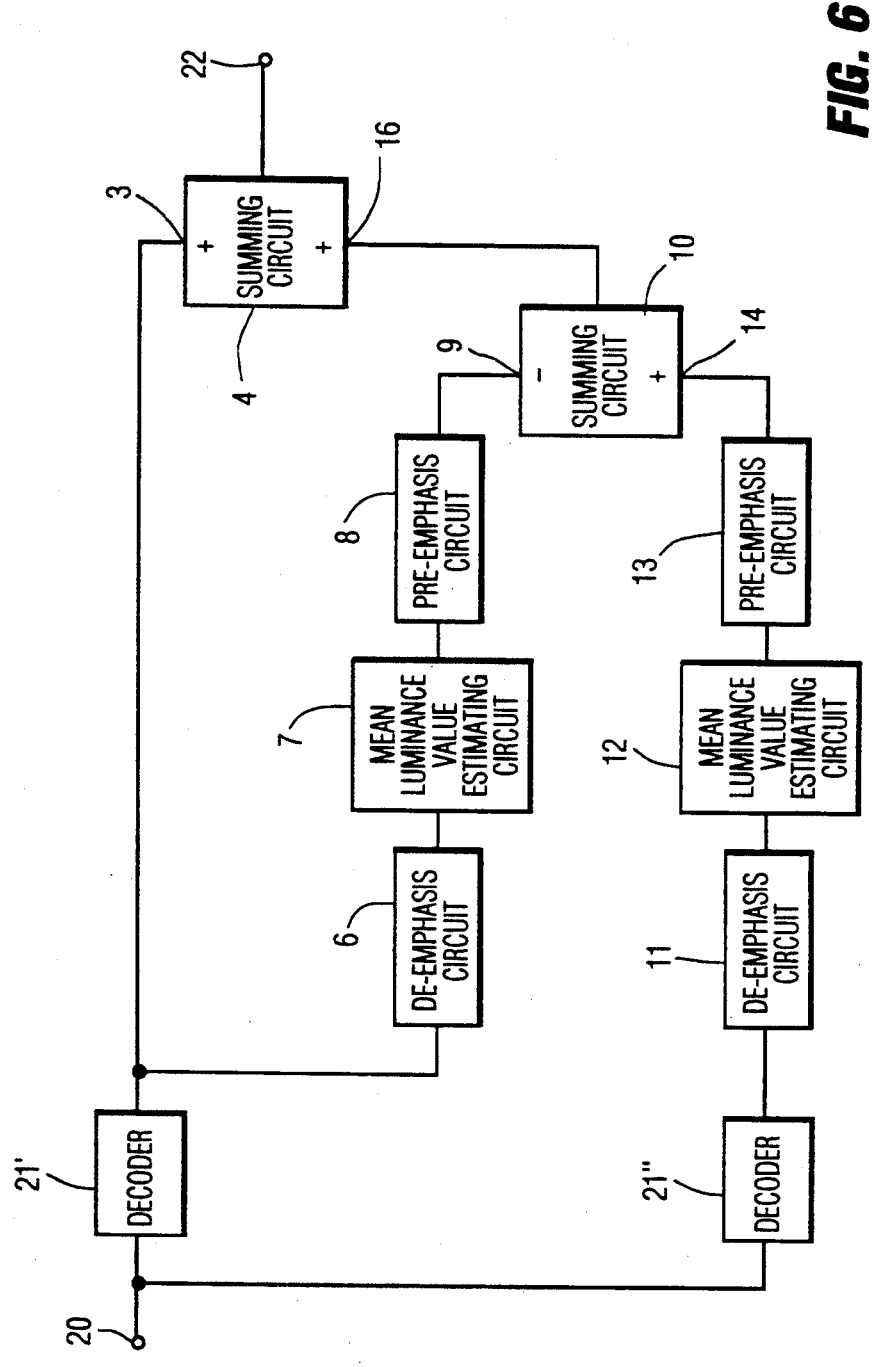
FIG. 6 is a further modification of the diagram of FIG. 2.
Figure 7:
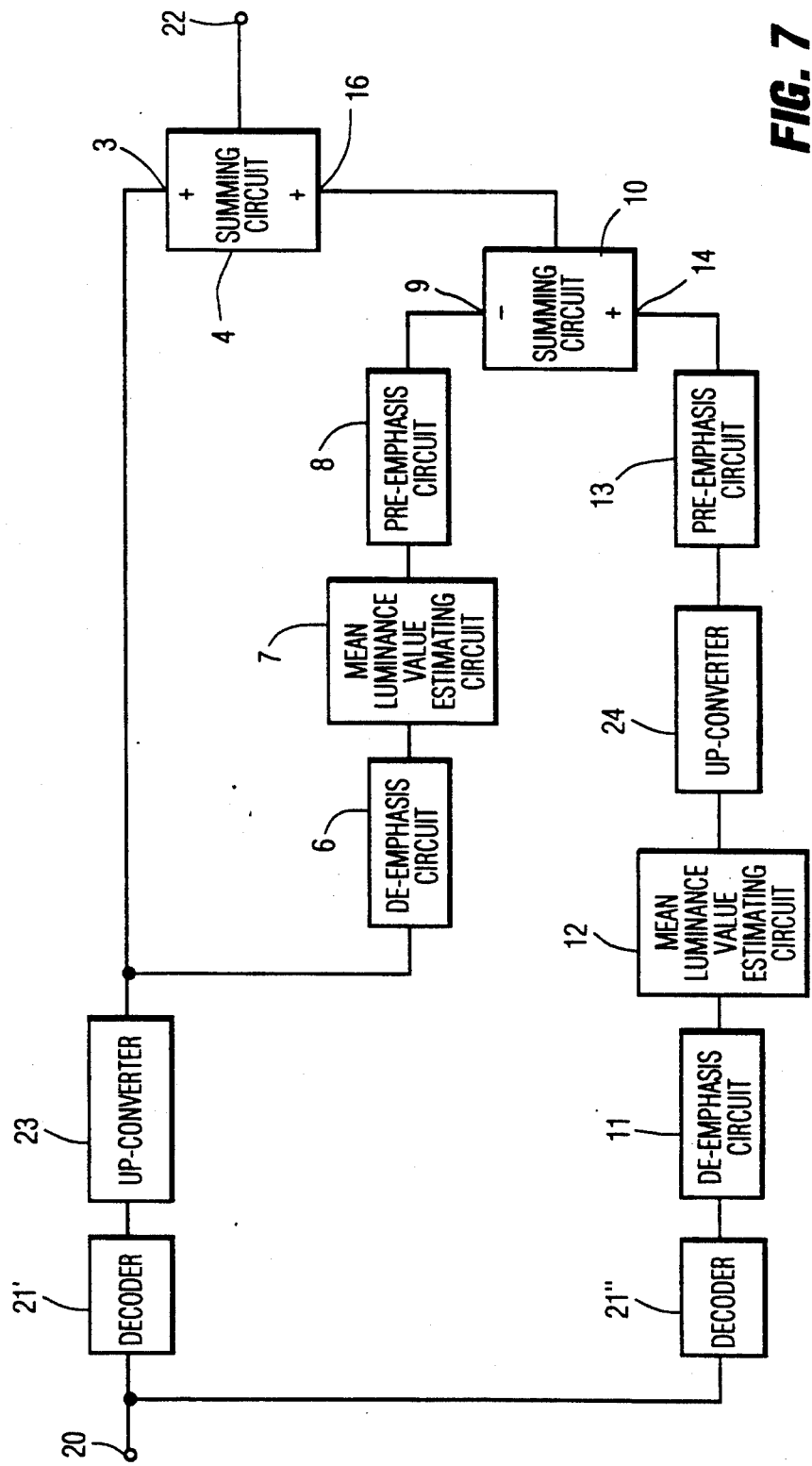
FIG. 7 is a further modification of the diagram of FIG. 3.

If the receiver manufacturer wishes to use a decoder whose characteristics differ substantially from the reference model decoder (5) used at the transmission side then a correction can be made. This uses an embodiment shown in FIG. 6 which is based on that shown in FIG. 2 and where like references used in both figures indicate like components having the same function which will not be further described. The differences between FIGS. 2 and 6 is that FIG. 6 has two decoders 21' and 21" where decoder 21' providing the input for the first and further paths is to the new design whereas decoder 21" providing the input to the reference path has the design of the reference model decoder. Such an arrangement ensures that the mean luminance of the overall decoder is equal to that of the reference decoder. Where the arrangement of FIG. 6 is required to have its output at a different field rate it may take the form shown in FIG. 7 which is based on FIG. 3 and where like references used in both figures indicate like components. FIG. 7, as with FIG. 6, employs the two decoders 21' and 21" to feed the various paths as indicated with respect to FIG. 6. The embodiment of FIG. 7 compensates for the change in the mean luminance introduced by both the new design of HD-MAC decoder 21' and the field rate converter. Although in FIGS. 6 and 7 two decoders 21' and 21" are shown as separate items many of the component parts of these decoders may be common.

So far the present application has been principally concerned with luminance adjustment technique of video signals and the specific embodiments have been described in relation to HD-MAC signals. It will be appreciated that the present application is not limited to high definition television and may be applied to other forms of video signal. One such application may be in the field of three dimensional (3-D) image synthesis. Our image synthesis work models the 3-D structure of an object as a large number of polygons, described by the positions of their vertices and surface characteristics. These are used to define the shape and lighting of the object when mapped onto the screen. The surface detail of the object is created using a texture map, which undergoes the same transformations as the polygons to produce a final image.

When creating a model of a natural object such as a human head, the texture map will often be derived from several characteristic views, e.g. front, sides, top and back. The texture for each polygon which makes up the head will be selected from these views. Problems occur when the texture for adjacent polygons originate in different characteristic views, between which there will be inevitable changes in lighting and possibly colour. It is therefore necessary to be able to blend the gross characteristics of the texture maps which originate from different views without losing the detail of the texture. This means that simple techniques, such as applying a low-pass spatial filter in the region of the boundary, are ineffective.

Figure 8:
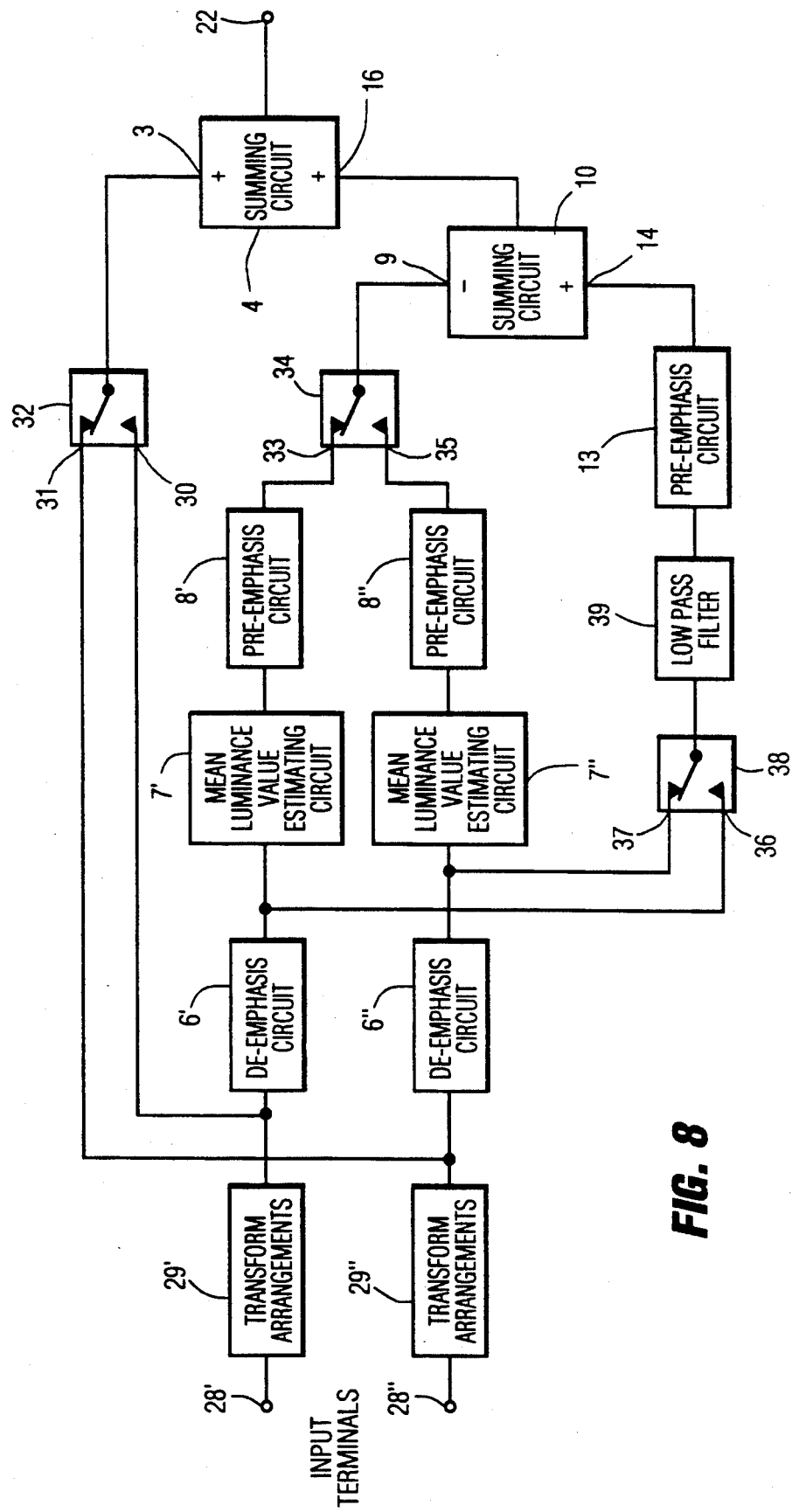
FIG. 8 is a block diagram of a third embodiment of apparatus according to the invention.

The luminance adjustment technique can be used to change the low-frequency characteristics of the texture, leaving the detail unaltered, as shown in FIG. 8, which is of similar form to that of FIG. 1 with corresponding components in the two figures being indicated by like references. In FIG. 8 two input terminals 28' and 28" receive stored texture signals which in the case of the above-mentioned human head may represent individual triangular sections from that head when viewed straight on, the input terminals 28', 28" not receiving the same signal but signals representing adjacent triangles which will be subsequently butted together. The signals from each input are applied to an associated geometric transform arrangements 29', 29" which are capable of changing the angle of view of each received triangular section signal. The output of the transform arrangements 29', 29" are conveyed over separate first paths to inputs 30, 31 of a first changeover switch 32 whose output is applied to the first input 3 of the first summing circuit 4. Each transform arrangement 29', 29" has its output applied to a separate further path comprising the elements 6', 7' and 8' in one further path and 6", 7" and 8" in the other further path which have the same functions as the elements 6, 7 and 8 present in the previously mentioned FIG. 1. The circuits for estimating mean luminance 7' and 7" may each comprise a low pass filter whose cut-off frequency is selected so that all unwanted lighting effects, such as shadows, are passed, but all wanted texture is rejected. The output of the said one further path is applied to an input 33 of a second changeover switch 34 whose other input 35 is connected to the output of the second further path. As there is no need to decode the signals as in the case of FIG. 1 the de-emphasis circuit of the reference path can comprise the corresponding circuits 6' and 6" in the further paths and whose outputs are applied to respective inputs 36 and 37 of a third changeover switch 38. The three changeover switches 32, 34 and 38 are operated simultaneously, in a manner not shown, but not at a fixed switching rate. The output of switch 38 is applied, in the reference path to a low pass filter 39 with a very low cut-off frequency across the boundary between the two maps to create a reference across the transition; as an alternative this may be derived directly from a lighting model. The input to filter 39 is linearized at 6', 6" to make the transition smooth. The filter output is applied to the pre-emphasis circuit 13 to provide gamma correction prior to application to summing circuit 10.

The outputs for the two textures in the further paths are switched and subtracted from the reference signal in the summing circuit 10 to form the adjacent signal which is added in summing circuit 4 to that in the first paths. This procedure will replace the transient along the boundary between the texture maps, which will also be present in the further path, with the smooth transition of the reference path.

From reading the present disclosure, other modifications will be apparent to persons skilled in the art. Such modifications may involve other features which are already known in the design, manufacture and use of apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. An apparatus for maintaining the mean values of the luminance and/or saturation of a video signal comprising a first path conveying a video signal with pre-emphasis having a pictorial content, wherein said apparatus further comprises
    a reference path having
        first de-emphasis means for removing the pre-emphasis present in a video signal in that path with a given pre-emphasis characteristic and the said pictorial content,
        first estimating means for estimating the mean values of the linearized signal from said first de-emphasis means, and
        first pre-emphasis means for applying pre-emphasis to the mean values obtained from said first estimating means and whose characteristic is substantially the inverse of that of said first de-emphasis means,
    a further path having
        second de-emphasis means for at least partially removing or modifying the pre-emphasis in a video signal in that path having the said pictorial content,
        second estimating means for estimating the mean values of the at least partially linearized or modified signal from said second de-emphasis means, and
        second pre-emphasis means for applying pre-emphasis to the mean values obtained from said second estimating means and whose characteristic is substantially the inverse of that of the second linearizing means,
    first summing means for producing the difference between the outputs of said first and second pre-emphasis means, and
    second summing means for adding this said difference to the video signal in said first path, the output of the second summing means forming the video signal with the required maintained mean values.

2. An apparatus as claimed in claim 1, wherein said apparatus additionally comprises means for motion compensated averaging the difference produced by said first summing means and for applying the averaged difference to said second summing means.

3. An apparatus as claimed in claim 1, in which the video signal in said first path is encoded according to a given standard in an encoder, wherein the video signal for said first path is derived from the output of said encoder whilst the video signal for said further path is the decoded output of said encoder, the video signal for said reference path being the video signal prior to encoding.

4. An apparatus as claimed in claim 3, in which said encoder changes the format of said video signal, wherein re-formatting means is provided between said first summing means or said motion compensated averaging means and said second summing means to provide conformity between the formats of the video signal at the output of the second summing means and that in said first path.

5. An apparatus as claimed in claim 1, wherein the video signal from said second summing means is for application to a display device of a type different to that intended by the video signal applied to said reference path, the characteristics of said second de-emphasis means and said second pre-emphasis means being matched to said different display device.

6. An apparatus as claimed in claim 1 for use in an arrangement which processes a video signal encoded to a given standard, wherein the arrangement comprises a decoder for decoding said encoded video signal, the output of the decoder providing the video signals for the first, the reference and the further paths.

7. An apparatus as claimed in claim 6, wherein the output of said decoder is applied to a standards converter whose output provides the video signal for the first and the further paths whilst a second standards converter, comparable to the first standards converter, is provided between the output of the first estimating means and the input of the first pre-emphasis means in said reference path.

8. An apparatus as claimed in claim 6, wherein the output of said decoder is applied to a first motion compensated temporal interpolator whose output is applied to said first and said further paths, a second motion compensated temporal interpolator being provided between the output of said first estimating means and the input of said first pre-emphasis means in the reference path.

9. An apparatus as claimed in claim 6, wherein said decoder is replaced by first and second decoders whose characteristics differ substantially from each other, said first decoder supplying signals to said first and further paths whilst said second decoder supplies signals to said reference path.

10. An apparatus as claimed in claim 1, wherein the first de-emphasis means in said reference path and the second de-emphasis means in said further path are formed by a common de-emphasis means.

11. An apparatus as claimed in claim 10, wherein said first path and said further path are each duplicated, the first duplicated paths being connected to respective first and second inputs of a first changeover switch while the further duplicated paths are connected to respective first and second inputs of a second changeover switch, the output of the duplicated de-emphasis means each being additionally connected to respective first and second inputs of a third changeover switch whose output is connected to said second estimating means in said reference path, the output from the first changeover switch providing a first path input to said second switching means while the output from the second changeover switch provides the further path input to said first summing means.

12. An apparatus as claimed in claim 11, wherein said first duplicated paths and said further duplicated paths are fed from duplicate input terminals, each input terminal receiving a positionally different but adjacent texture map input signal while said first estimating means creates a reference across the transition between adjacently positioned signals.

13. A method for maintaining the mean values of the luminance and/or saturation of a video signal with pre-emphasis having a pictorial content, comprising the steps of:
 i) de-emphasizing a reference video signal with a given pre-emphasis characteristic and said pictorial content to produce a first video signal without pre-emphasis,
 ii) estimating first mean values of said de-emphasized first video signal,
 iii) applying pre-emphasis to said first means values, the characteristic of the pre-emphasis being substantially the inverse of the first de-emphasis,
 iv) de-emphasizing a video signal having said pictorial content to produce a substantially de-emphasized second video signal with at least reduced or modified pre-emphasis,
 v) estimating second mean values of said substantially de-emphasized second video signal,
 vi) applying a pre-emphasis to said second mean values, the characteristic of the pre-emphasis being substantially the inverse of the second de-emphasis,
 vii) determining the difference between the pre-emphasized first and second mean values, and
 viii) adding the said difference to a pre-emphasized video signal having the said pictorial content to form the video signal with the required mean values.

14. A method for maintaining the mean values of the luminance and/or saturation of a video signal with pre-emphasis having a pictorial content, comprising the steps of:
 i) applying de-emphasis to a reference video signal with a given pre-emphasis characteristic and said pictorial content to produce a first video signal without pre-emphasis,
 ii) estimating first mean values of said de-emphasized video signal,
 iii) applying pre-emphasis to said first mean values, the characteristic of the pre-emphasis being substantially the inverse of the first de-emphasis,
 iv) estimating second mean values of said de-emphasized second video signal,
 v) applying a pre-emphasis to said second mean values, the characteristic of the pre-emphasis being substantially the inverse of the second de-emphasis,
 vi) determining the difference between the pre-emphasized first and second mean values, and
 vii) adding said difference to a pre-emphasized video signal having said pictorial content to form the video signal with the required mean values.

15. A method as claimed in claim 13 wherein said difference is subjected to motion compensating averaging prior to adding to said pre-emphasized video signal.

16. A method as claimed in claim 13, in which said pre-emphasized video signal is encoded according to a given standard, wherein said first de-emphasis is of the pre-emphasized video signal prior to encoding while the second pre-emphasis is of the encoded pre-emphasized television signal after it has been decoded, the said difference being added to the encoded pre-emphasized video signal.

17. A method as claimed in claim 16, in which the encoding of said video signal changes its format, wherein said difference is re-formatted prior to said addition to ensure conformity between the formats of the video signals prior to and following said addition.

18. A method as claimed in claim 13, in which said pre-emphasized video signal to which said difference has been added is for application to a display device of a type different to that intended for the pre-emphasized video signal prior to de-emphasis, wherein the characteristics of the second de-emphasis and the pre-emphasis applied to the second mean values are matched to the different display device.

19. A method as claimed in claim 13 for use in an arrangement which processes a video signal encoded according to a given standard, wherein said encoded video signal is decoded prior to being subjected to first or second de-emphasis or added to the said difference.

20. A method as claimed in claim 19, wherein the decoded video signal is subjected to standards conversion prior to second de-emphasis or addition to the said difference while the substantially de-emphasized video signal following first de-emphasis is subjected to standards conversion prior to pre-emphasis of the first mean values.

21. A method as claimed in claim 19, wherein motion compensated temporal interpolation is applied to the decoded video signal and to said first mean values.

22. A method as claimed in claim 14, wherein said video signal comprises first and second components whose pictorial content differ from each other, the first and second components each being subjected to steps (iv) and (v) while said difference is between the pre-emphasized second mean values alternately derived from said first and second components and the pre-emphasized first mean values, the reference video signal being alternately derived from said first and second components while the said difference is alternately added to said first and second components.

* * * * *